S. B. DONCHIAN, DEC'D.
A. A. DONCHIAN, ADMINISTRATRIX.
CARPET AND RUG FASTENER.
APPLICATION FILED AUG. 4, 1910.
977,857.
Patented Dec. 6, 1910.
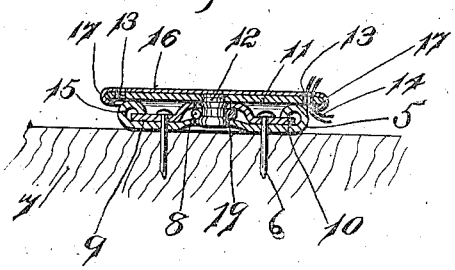
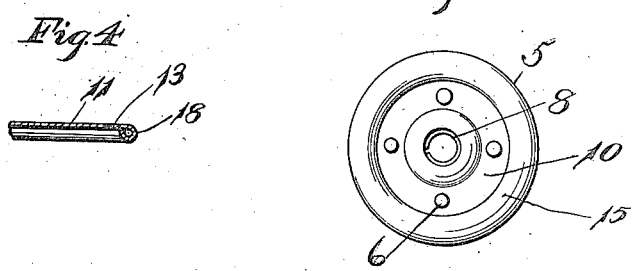
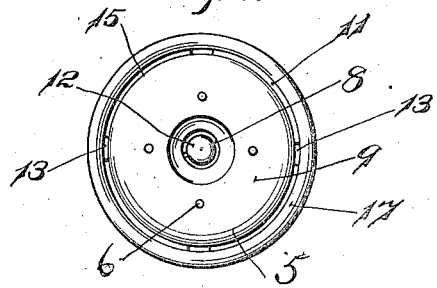
WITNESSES:
INVENTOR.
Samuel B. Donchian,
BY
Arthur B. Jenkins
ATTORNEY.

UNITED STATES PATENT OFFICE.

SAMUEL B. DONCHIAN, OF HARTFORD, CONNECTICUT; ARMENOUHI A. DONCHIAN ADMINISTRATRIX OF SAID SAMUEL B. DONCHIAN, DECEASED.

CARPET AND RUG FASTENER.

977,857.

Specification of Letters Patent.   Patented Dec. 6, 1910.

Application filed August 4, 1910.  Serial No. 575,553.

*To all whom it may concern:*

Be it known that I, SAMUEL B. DONCHIAN, a citizen of the United States, and a resident of Hartford, in the county of Hartford and State of Connecticut, have invented a new and Improved Carpet and Rug Fastener, of which the following is a specification.

My invention relates to the class of fasteners for removably securing a carpet or rug in place, and the object of my invention is, among others, to provide a fastener that may be used upon rugs and carpets of comparatively thin texture as well as upon the thicker grades with little if any prominence, and one in which the element of wear shall be reduced to a minimum.

One form of device in the use of which the objects above mentioned may be attained is illustrated in the accompanying drawings, in which—

Figure 1 is a view in central vertical section of my improved fastener. Fig. 2 is a detail top plan view of the lower member. Fig. 3 is a bottom view of the fastener. Fig. 4 is a detail view in section through a portion of the upper member showing a modified construction.

In devices of the prior art and especially that of my Patent No. 541,320, dated June 18, 1895 the upper or outer member of the fastener rests upon the floor and the other member is closely fitted within it. Owing to the smallness of the device and the thus necessarily close fitting parts, the accumulation of but little dust or dirt underneath the lips of the outer shell or between it and the inner member of the fastener or beneath the stud will prevent the latter from entering its socket sufficiently to be held by the spring ring. Further than this, the rounded bulbous shape of the fastener produces a surface of small tapered area which causes the fastener to be protruded into the carpet or rug, through which its presence is more or less prominent, and this feature also causes the fastener to soon wear a hole through the carpet or rug.

My improved fastener, constructed as herein illustrated and described, obviates the conditions above mentioned, and the upper member of the fastener is caused to rest entirely on the under member at comparatively small points or lines of contact, so that there is little liability of accumulation of dust or dirt to prevent the ready operation of the fastener. The upper surface of the fastener is provided with a substantial bearing surface to rest against the rug or carpet, this upper surface being formed flat, and there is therefore no reduced surface at the extreme top to cause the fastener to be protruded into the material of the carpet or rug and thus prominently appear on the upper surface, and the element of wear from this cause is reduced to a minimum.

In the accompanying drawings the numeral 5 denotes the lower member of the fastener which is provided with means as holes for nails 6 to secure it to a floor 7 or like surface. This lower member has a recess for a fastening ring 8, preferably an expansible ring, as herein shown this ring recess being located between two plates 9—10. In my improved construction one of these plates is folded over the edge of the other plate to secure the two plates together, preferably the lower plate being turned over the edge of the upper plate. This overturned edge provides a rest for the upper plate extending completely around the lower plate. The upper member 11 is of a size to project but a short distance beyond the periphery of the under member so that little leverage is afforded for pressure at its outer edge and there is therefore little liability of separation of the members by any pressure which may occur at this point. This upper member has a stud 12 projecting into an opening in the lower member and into the ring 8 by means of which the two sections of the fastener are held firmly together.

Openings 13 for the reception of thread to secure the upper member of the fastener to a rug or carpet are provided.

The conditions necessitate a somewhat exaggerated showing in the drawings and in order to clearly bring out the construction the metal is shown relatively thicker than it will be under actual conditions, so that the upper member will lie closer to the floor 7 than appears from the drawing, and the thread 14 will to a great extent close the space between the floor and the upper member.

A recess 19 is formed on the bottom of the under member of the fastener, and the stud 12 is of such length that it will not reach the surface of the floor 7.

From this construction it will be seen that the upper member rests entirely upon the lower member and there is no chance for accumulation of dirt under the outer edge of the upper member. The roll 15 on the lower member affords a rest for the upper member, on substantially a line bearing, so that there is little chance for dust to collect at this point, and the stud 12 not reaching the surface of the floor there is little liability of collection of dust under the stud to prevent the ready connection of the members of the fastener.

The stud 12 is riveted to the member 11, causing more or less roughness at the upper surface of the member 11, which constitutes an element of wear. The stud 12 may be formed as an integral part of the member 11 and with great care after the riveting operation the outer surface of the plate 11 could be smoothed off so that this roughness would not appear, and I contemplate such a construction in some instances. In order, however, to avoid such finishing labor, in cases where it may be well to dispense with it, a covering plate 16 is provided extending over the upper surface of the plate 11 and rounded about its outer edge at 17. This provides also a rounded edge next to the thread to prevent its wear. As shown in Fig. 4, when the plate 16 is dispensed with, as outlined above, the plate 11 may be rounded at its edge as at 18.

I do not limit my invention and the scope of the following claims to the foregoing illustration and description of the preferred form of device in which it has been embodied, as these may be departed from to a greater or lesser extent without avoiding the invention.

I claim—

1. A fastener including a lower member having means to secure it to a surface and a socket for a stud, said lower member also having a narrow bearing for an upper member, said bearing being located near the edge of the upper member a friction member located within said lower member, and an upper member having a stud to be engaged by said friction member, the edge of said upper member being located at a distance from the plane of the under bearing surface of the lower member.

2. A fastener including a lower member having means for securing it to a surface and including upper and lower plates secured together by means of an overturned edge one of said plates providing a narrow bearing, a friction member located in a recess between the plates, an upper member resting wholly upon said ridge and having a stud to be grasped by said friction member, the outer edge of said upper member resting at a distance from the plane of the lower bearing surface of the lower member.

3. A fastener including a lower member having means for securing it to a surface and a recess for a friction member, said lower member also having a narrow bearing for an upper member, said bearing being located at a distance from the center of said member the upper member having a stud to be grasped by said friction member, said upper member having its upper surface parallel with the lower bearing surface of the lower member and an outer projecting edge located at a distance from the plane of said bearing surface.

4. A fastener including a lower member having a recess in its under surface with an opening extending into said recess, said under member also having a narrow bearing for an upper member, a friction member held by said lower member, an upper member having a stud to be grasped by said friction member, said upper member resting wholly upon the narrow bearing of the lower member with its projecting edge located at a distance from the plane of the bearing surface of the lower member, the end of said stud resting in said recess above the surface of the floor when the parts are in engagement.

5. A fastener including two members, one having means for securing it to a surface and one of said members having a socket for a friction member to receive a stud from the other member, the outer edge of one of said members projecting but slightly beyond the periphery of the other member and said edge being located at some distance from the plane of the bearing surface of the other member, and the stud projecting into said friction member.

SAMUEL B. DONCHIAN.

Witnesses:
ARTHUR B. JENKINS,
LENA E. BERKOVITCH.